Aug. 31, 1954     J. A. BREWER     2,687,773
MILKING MACHINE TIMER

Filed July 14, 1953     2 Sheets-Sheet 1

INVENTOR.
JAMES A. BREWER
BY *Scott L. Nowick*
*Atty*

Aug. 31, 1954  J. A. BREWER  2,687,773
MILKING MACHINE TIMER

Filed July 14, 1953  2 Sheets-Sheet 2

*INVENTOR.*
JAMES A. BREWER
BY Scott L. Norviel
atty.

Patented Aug. 31, 1954

2,687,773

UNITED STATES PATENT OFFICE 2,687,773

MILKING MACHINE TIMER

James A. Brewer, Phoenix, Ariz.

Application July 14, 1953, Serial No. 367,910

4 Claims. (Cl. 161—7)

This invention concerns milking machine timers.

Where cows are milked with automatic mechanical milkers modern practice requires that the teat cup assembly be supported on a swinging arm and that the milking assembly, including the teat cups, the receiving vessel and other associated apparatus will be swung from beneath the cow when milking is completed. In large dairies the individual milking receiver has been supplanted by a milk line which is, as a rule, a stainless steel tube extending along the milking stalls and connected to a large receiver at the end on which vacuum is drawn. At the several milking stations there are fittings which join to the milking apparatus above mentioned. Vacuum is maintained on the milk line at all times during the milking period. In stations which are not operating, valves are provided so that the milking apparatus at that station is entirely disconnected. The practice with this type of plant demands that when the milking of a cow is finished at any one station the fitting going to the milking apparatus at that station is closed and disconnected and the vacuum broken so that the teat cups will automatically drop from the cow's teats. When this is done the swinging support for the milking apparatus swings out from under the cow and she is free to move from the station to the loafing barn.

Since each cow has a milking time which can be determined by trial, the period of time necessary to milk her dry may be accurately timed when she is positioned at her milking station.

In view of this one of the objects of this invention is to provide a simple and easily cleaned milking timer which can be inserted between the milk line and the milking apparatus above mentioned and which can be set by the operator so that, within a pre-determined time after the commencement of a milking operation, the vacuum line leading to the main milk line will be closed, and the vacuum in the milking apparatus broken so that it will automatically remove from the cow's teats.

A second object of the invention is to provide a milking timing valve which may be set as desired and at the end of a pre-determined period will disconnect milking apparatus from the milk line, break the suction in the milking apparatus so that the teat cups will remove from the teats, and will close the milking line so that vacuum is not lost and air will not enter it.

The third object is to provide a valve as above stated which will break the vacuum in the milking apparatus and automatically close the milk line so that the vacuum therein will not be broken, and which has accessible parts which may be easily cleaned and sterilized.

Other objects will appear hereinafter.

I attain the foregoing objects by means of the mechanism, devices and combination of parts shown in the accompanying drawings in which—

Similar numerals refer to similar parts in the several views.

Figure 1:
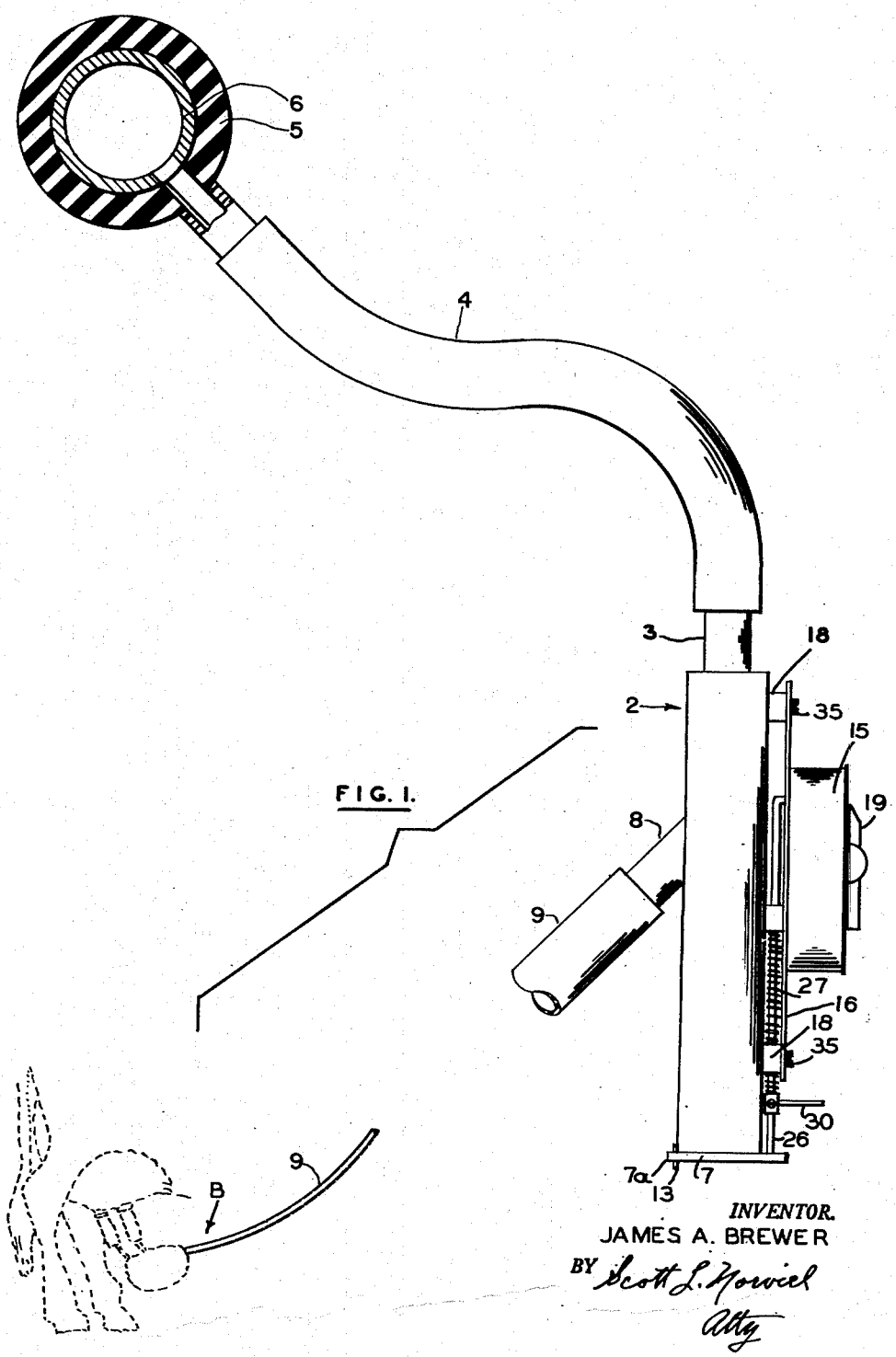
Figure 1 is a side elevation of my improved milk machine timer, shown attached to a milk line and with the milking machine mechanism indicated in dotted outline and on a smaller scale.
Figure 2:
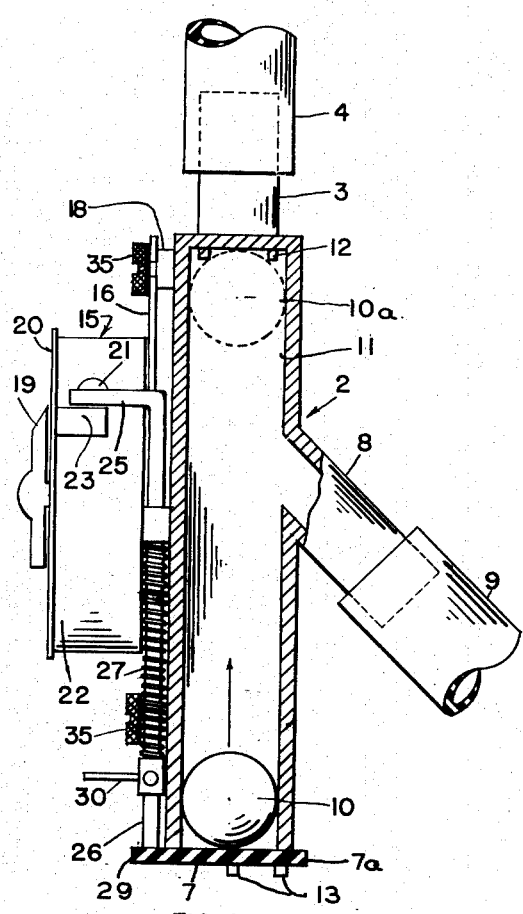
Figure 2 is a vertical side section of my milking machine timer and valve, sectioned substantially on the longitudinal axis of the valve, and drawn on a slightly larger scale.
Figure 3:
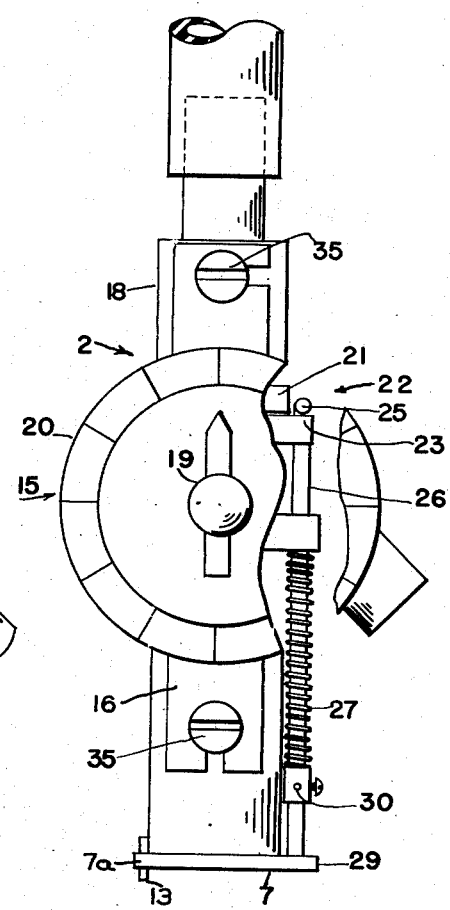
Figure 3 is a front elevation thereof with certain parts broken away to show the structure beneath.
Figure 4:
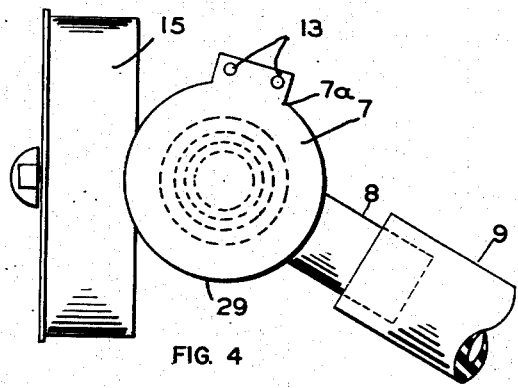
Figure 4 is a bottom view of said timer and valve.

The body 2 of the valve consists of a tube which has a hose nipple 3 at the top adapted to connect to a vacuum hose 4 which is in turn attached to a rotary sleeve valve 5 on milk line 6. It is thought that the operation of the rotary valve is well known to the art and details of its structure and operation are unnecessary.

A clapper valve 7 of rubber or similar composition, having a hinge-like rear end 7a, is attached to the lower end of body 2 by engaging holes in its rear end on pins 13 which depend from the lower end of the body. Midway of the body there is a radially and downwardly extending nipple 8 which connects to tube 9 leading to the milking apparatus B. A valve seat 12 for ball valve plug 10 is formed at the top of the body at the inner end of hose nipple 3. A ball 10, loosely fitting and slidable in the bore 11 within body 2 forms a valve plug and normally rests on the clapper valve 7. When sufficient vacuum is drawn through the milk line, and when clapper valve 7 is opened, this ball acts as a piston and is drawn up within the body 2 until it closes on the valve seat 12. This shuts off, or disconnects the milk line 6 from the valve bore 11 and admits air to the milking apparatus B which is attached to the valve through tube 9 on nipple 8. Note that the opening of nipple 8 into bore 11 is smaller than ball 10 so that it cannot enter this nipple.

In order to open the clapper valve 7 at a predetermined time, I provide a timing clock 15 secured to body 2 by easily detachable plate 16 secured to lugs 18 on the valve body by screws 35. This timing clock is set by a nob 19 and indicates the setting time on a dial 20. The mechanism of the clock is conventional and is arranged so that a clapper 21 is forced outward from the clock case 22 when the determined time for which the clock is set expires. On one side of the clock case 22 there is a shelf 23 which acts as a sear to retain the angular bend 25 of the plunger rod 26 when it is drawn upward against the tension of spring 27. The lower end of plunger 26 is positioned on the clock case so that when the clock is attached to body 2 of the valve it will contact when downwardly extended the outwardly extending lip 29 of clapper valve 7 at a position substantially opposite its attachment on the bottom of body 2.

The parts above mentioned are arranged so that the plunger may be raised by a handle 30 near its lower end to a position where its top bend 25 will engage over the sear 23 which is directly in front of the clapper 21 of clock 15. This is done prior to setting the time nob 19 of the clock. The timing nob may then be set for the desired time necessary to complete the milking of a cow, and when this time has expired the clapper will dislodge the angular upper bend 25 of the plunger from the sear, thus causing the plunger 26 to descend under the urge of spring 27 which will open the clapper valve 7.

In use, the tube 9, leading to the milking apparatus B, is connected to the nipple 8; ball valve 10 normally rests on clapper valve 7, and nipple 3 is connected by tube 4 to valve 5 on the milk line 6. The bend 25 of plunger 26 is then placed on sear 23 and the timing clock set for the time necessary to milk the cow at the station where the apparatus is placed. After the teat cups are in place on the cow valve 5 is opened and the milk line is connected through bore 11 of body 2, suction is applied to tube 9, and the operation of milking is commenced. The timing clock is then set for the time necessary to completely milk the cow at this station and the milking operation continues until the clock actuates clapper 21. This causes the plunger 26 to open the clapper valve 7. When this is done the vacuum in the bore 11 of body 2 is broken and air enters from the bottom. Valve ball 10 then ascends the inner bore 11 of body 2 to position 10a and closes on seat 12. This closes the milk line and prevents air from entering it. At the same time air entering the lower part of bore 11 also enters the line 9 on nipple 8 leading to the milking apparatus. This causes the vacuum to be broken on the teat cups which then fall from the cow's teats. The entire milking apparatus B may then be swung out from under the cow.

Thereafter, at the convenience of the operator, the timing valve may be entirely disconnected from the milk line by swinging upward and closing sleeve valve 6. The timer mechanism and valve, body 2, may then be disconnected by removing nipple 3 from hose 4 and by removing nipple 8 from tube 9. The timing clock 15 and its attendant parts may then be detached from the lugs on body 2 by loosening screws 35. The body 2, the clapper valve 7, and the valve ball plug 10 may then be washed and sterilized.

From the foregoing it will be understood that I have provided a valve which can be easily inserted between the milk line valve 5 and the tube 9 leading to milking apparatus B, and which will shut off the milk line from the milking apparatus when the predetermined milking time of a cow, to which the milking apparatus is applied, has expired and will break the vacuum on the milking apparatus at the same time to release the milking apparatus from the cow.

The use of a conventional or standard timing clock 15 and simple tripping apparatus makes the mechanism cheap, easily maintained and fool proof. The easy detachment of the timing mechanism from the valve body, permits the latter to be readily cleaned. All parts of the valve are readily disassembled for washing and sterilizing, and there are no pockets or crevices which will harbor bacteria.

I claim:

1. In a mechanical milking device including a milk line on which vacuum is drawn having a shut off valve and milking apparatus, including teat cups, a milking timer connected between said milk line and said milking mechanism consisting of a cylindrical valve body having an axial base, a nipple at its upper end connected thru a hose to said milk line valve, a clapper valve of resilient material normally closing its lower end, a valve seat within its upper end opening into said nipple thereon, a nipple connected to the central portion of said bore and extending substantially radially from said valve body connecting to a tube leading to said milking apparatus, a timing clock removably attached to said valve body having a setting knob and a clapper, a sear attached to said clock adjacent said clapper, spring tensioned plunger urging said clapper valve to be opened position having a bend at its upper end engaging said sear and positioned to be disengaged therefrom by said clock clapper, and a ball valve plug normally resting on said clapper valve and closing on said valve seat at the upper end of said valve body bore when air enters said bore due to the opening of said clapper valve.

2. A milking apparatus timing valve composed of a cylindrical tubular body, a nipple at the top of said body for connection to a milk line having an axial opening, a normally closed clapper valve closing the lower end of said body, a nipple for connecting the interior of said body to milking apparatus positioned intermediate the top and bottom of said body, a valve seat within said body surrounding the axial opening of said nipple at the top of said body, a ball valve plug loosely fitting within the interior of said valve body and normally resting on said flapper valve, timing mechanism including a setable clock having a timed clapper operating adjacent a sear shelf, a plunger having a bend at its top engaging on said sear, a spring urging said plunger toward said clapper valve and forcing it open when said plunger bend is disengaged from said sear by said clapper; said ball valve plug being disposed to ascend thru said body and close on said valve seat when said clapper valve is opened.

3. In a mechanical milking apparatus having a milk line on which vacuum is drawn, a timing valve for closing the vacuum line and admitting air to the milking mechanism and teat cups composed of a tubular body having a nipple connecting to the vacuum line at its upper end and a rubber clapper valve normally closing its lower end, an intermediately positioned nipple connecting to said milking apparatus, and a valve seat at the inner end of said nipple at its top, a ball valve plug freely movable within said tubular body, normally resting on said clapper valve and closing on said valve seat when drawn upward through said valve body by suction from said milk line when said clapper valve is opened, and timing mechanism, for opening said clapper valve, including a settable clock having a clapper, actuated by said clock at the end of a determined set time, a spring tensioned plunger rod normally contacting and holding open said clapper valve, and engageable in cocked position on a sear shelf on said clock out of contact with said clapper valve; said plunger being disposed so as to be released from said sear when engaged by the clapper of said clock and to move to its normal position opening said clapper valve.

4. In a mechanical milking apparatus including a milk line on which suction is drawn by vacuum apparatus, and a milking mechanism including teat cups, a timing valve for insertion in tubing connecting said milking mechanism with said milk line for ceasing and disconnecting said milk line from said milking mechanism and admitting air into said milking mechanism composed of a tubular body having a circular longitudinal bore, a nipple at its top connecting to said milk line, a valve seat at the inner end of said nipple within said bore, a rubber clapper valve at its lower end hinged to said body at one side with the other unhinged side normally resiliently closing on the lower end of the bore of said valve body, a ball valve plug freely movable within said bore, normally resting on said clapper valve, and closing on said valve seat when drawn upward thereon by suction from said milk line, a nipple extending radially from said body at a position above the top of said ball when resting on said clapper valve, having an opening smaller than said ball and connecting with said tubing leading to said milking mechanism, and timing mechanism detachably connected to said body for opening said clapper valve and admitting air into said valve body including a clock having mechanism operating a clapper at an instant of time after a predetermined period of time, and operating mechanism opening said clapper valve at said instant of time.

References Cited in the file of this patent

UNITED STATES PATENTS

| Number | Name | Date |
|---|---|---|
| 1,445,599 | Knapp | Feb. 13, 1923 |
| 1,495,495 | Naylor | May 27, 1924 |
| 1,545,645 | Erling | July 14, 1925 |
| 2,641,223 | Van Der Plate | June 9, 1953 |

FOREIGN PATENTS

| Number | Country | Date |
|---|---|---|
| 15,010/33 | Australia | July 6, 1934 |
| 563,390 | Great Britain | Aug. 11, 1944 |